US008199256B2

(12) United States Patent
Kaneko et al.

(10) Patent No.: US 8,199,256 B2
(45) Date of Patent: Jun. 12, 2012

(54) THREE-DIMENSIONAL Y/C SEPARATING CIRCUIT

(75) Inventors: Mari Kaneko, Kanagawa (JP); Hirotoshi Aizawa, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 315 days.

(21) Appl. No.: 12/602,814

(22) PCT Filed: Aug. 6, 2008

(86) PCT No.: PCT/JP2008/064555
§ 371 (c)(1), (2), (4) Date: Dec. 3, 2009

(87) PCT Pub. No.: WO2009/020238
PCT Pub. Date: Feb. 12, 2009

(65) Prior Publication Data
US 2010/0194978 A1    Aug. 5, 2010

(30) Foreign Application Priority Data
Aug. 8, 2007 (JP) ................................. 2007-207059

(51) Int. Cl.
*H04N 9/77* (2006.01)

(52) U.S. Cl. ........ 348/663; 348/664; 348/665; 348/666; 348/667; 348/668; 348/669; 348/670; 348/454

(58) Field of Classification Search .................. 348/663, 348/664, 665, 666, 667, 668, 669, 370, 454
See application file for complete search history.

(56) References Cited

U.S. PATENT DOCUMENTS
5,473,389 A * 12/1995 Eto et al. ....................... 348/669
(Continued)

FOREIGN PATENT DOCUMENTS
JP         01-277094        11/1989
(Continued)

OTHER PUBLICATIONS
International Search Report for PCT/JP2008/064555 mailed on Sep. 30, 2008.

*Primary Examiner* — Jefferey Harold
*Assistant Examiner* — Mustafizur Rahman
(74) *Attorney, Agent, or Firm* — Turocy & Watson, LLP

(57) ABSTRACT

To provide a three-dimensional Y/C separating circuit that has a high responsibility to a motion in a video signal and can reduce a memory capacity, a three-dimensional Y/C separating circuit has a 2-frame memory 14 that delays a color signal by an inversion period thereof to produce a delayed composite video signal, a luminance motion detecting part that produces a first frame correlation signal by a subtraction processing between the delayed composite video signal and a composite video signal, an adding circuit 23 that produces a mixed video signal by an addition processing between the delayed composite video signal and the composite video signal, a frame memory 24 that delays the mixed video signal by one frame period, a subtracting circuit 25 that produces a second frame correlation signal by a subtraction processing between the mixed video signal and the mixed video signal delayed by one frame period, a determining circuit 26 that determines a motion from the first and second frame correlation signals and produces a mixing ratio controlling signal, and mixing circuits that output a luminance signal and a color signal, respectively, based on the mixing ratio controlling signal.

13 Claims, 9 Drawing Sheets

U.S. PATENT DOCUMENTS

| | | | |
|---|---|---|---|
| 5,475,445 A * | 12/1995 | Yamaguchi et al. | 348/663 |
| 5,585,861 A * | 12/1996 | Taniguchi et al. | 348/669 |
| 5,589,888 A * | 12/1996 | Iwasaki | 348/669 |
| 5,990,978 A * | 11/1999 | Kim et al. | 348/663 |
| 6,288,754 B1 | 9/2001 | Ito | |
| 6,400,762 B2 * | 6/2002 | Takeshima | 375/240.01 |
| 6,774,954 B1 * | 8/2004 | Lee | 348/665 |
| 7,196,736 B2 * | 3/2007 | Ogawa | 348/670 |
| 7,304,688 B1 * | 12/2007 | Woodall | 348/663 |
| 7,324,163 B2 * | 1/2008 | Bacche | 348/663 |
| 7,336,321 B2 * | 2/2008 | Suzuki et al. | 348/663 |
| 7,420,624 B2 * | 9/2008 | Lin et al. | 348/663 |
| 7,646,436 B1 * | 1/2010 | Woodall | 348/668 |
| 7,663,702 B2 * | 2/2010 | Park et al. | 348/663 |
| 7,773,157 B2 * | 8/2010 | Park et al. | 348/663 |
| 2005/0134744 A1 | 6/2005 | Shan et al. | |

FOREIGN PATENT DOCUMENTS

| | | |
|---|---|---|
| JP | 03-256490 | 11/1991 |
| JP | 10-341454 | 12/1998 |
| JP | 2000-115710 | 4/2000 |
| JP | 2000-312366 | 11/2000 |
| JP | 2002-354499 | 12/2002 |
| JP | 2005-184766 | 7/2005 |
| JP | 2007-158991 | 6/2007 |

* cited by examiner

THREE-DIMENSIONAL Y/C SEPARATING CIRCUIT

TECHNICAL FIELD

The present invention relates to a three-dimensional Y/C separating circuit that separates a luminance signal and a color signal of a composite video signal.

BACKGROUND ART

Some of conventional television sets, video tape recorders or the like use a three-dimensional Y/C separating circuit adapted to process motions in pictures in order to improve separability of luminance signals and color signals. The three-dimensional Y/C separating circuit performs a still image Y/C separation processing for separating luminance signals and color signals by performing an arithmetic operation between screens, for example, between frames, and a moving image Y/C separation processing for separating luminance signals and color signals by performing an arithmetic operation in a screen, for example, between lines. The still image Y/C separation process based on the arithmetic operation between frames is also referred to as frame correlation separation processing, and the moving image Y/C separation processing based on the arithmetic operation between lines is also referred to as line correlation separation processing.

A three-dimensional Y/C separating circuit is described in detail in Japanese Patent Application Laid-Open Publication No. 2000-312366.

The three-dimensional Y/C separating circuit detects a motion in a picture based on the degree of the frame correlation, which is represented by the difference in input composite video signal between frames, and adaptively switches between the moving image Y/C separation processing and the still image Y/C separation processing based on the result of the motion detection. Therefore, in the three-dimensional Y/C separating circuit, motion detection and motion adaptive operation are important factors that determine the Y/C separation performance.

In the still image Y/C separation processing by the three-dimensional Y/C separating circuit, for example, since the phase of color signals of NTSC-format video signals is inverted every frame, luminance signals and color signals are separated by addition or subtraction of video signals between frames. In the moving image Y/C separation processing by the three-dimensional Y/C separating circuit, since the phase of color signals is inverted every line, luminance signals and color signals are separated by addition or subtraction of video signals between lines.

Both the Y/C separation processing based on the frame correlation and the Y/C separation processing the line correlation can separate luminance signals and color signals with reliability if the video signals to be subjected to the arithmetic operation are based on the same picture. In the case of a still image, the picture does not change between adjacent frames, so that the separation performance of the still image Y/C separation processing is high. In the case of a moving image, if video signals for vertically adjacent lines are highly correlated to each other, such as in the case of a relatively large pattern, the separation performance of the moving image Y/C separation processing is high. However, if video signals for vertically adjacent lines are poorly correlated to each other, such as in the case of a fine pattern, the separation performance of the moving image Y/C separation processing is relatively low. Therefore, the three-dimensional Y/C separating circuit determines whether a region that is the target of Y/C separation is a still image or a moving image so that the still image Y/C separation processing is performed when there is a frame correlation or, in other words, in the case of a still image, and sets a motion adaptive operation based on the result of the determination.

In motion determination, that is, frame correlation detection in the three-dimensional Y/C separating circuit, a 1-frame correlation detection for detecting a luminance signal motion and a 2-frame correlation detection for detecting a color signal motion are performed. Motion determination is carried out using the result of the 1-frame correlation detection and the 2-frame correlation detection.

A motion in an image can be determined by determining the difference between video signals for adjacent frames. However, color signals for adjacent frames are in opposite phase to each other, so that the difference between video signals for adjacent frames includes a color component. Thus, taking advantage of the fact that the color signal in the NTSC system lies in a band of 3.6 MHz±1.5 MHz, a low pass filter that allows signals at low frequencies (equal to or lower than 2 MHz, for example) to pass through is used to impose a band restriction on the difference between video signals for adjacent frames, so that motion detection for luminance signals can be achieved.

In this case, because of the band restriction, the 1-frame correlation is not sufficient to detect a fine motion in a picture and a motion in a color signal. Thus, a correlation between video signals for every two frames is detected. Color signals for every two frames are in phase with each other, and a motion in a color signal can be detected by determining the difference between video signals for every two frames.

However, while the Y/C separation processing uses video signals for adjacent frames to separate color signals and luminance signals, the difference between every two frames is determined for motion detection for color signals. Thus, in order to accurately detect a color signal motion component, a temporal filter is used. The temporal filter compares the magnitude of the current frame correlation and the magnitude of the frame correlation further delayed by one frame and detects the larger frame correlation. That is, the temporal filter selects the frame correlation for which the motion in the color signal is larger. However, the temporal filter poses a problem that the responsibility to motions in the input video signals becomes lower, because the temporal filter detects the motion in the color signal using not only the current frame correlation but also the frame correlation for the immediately preceding frame.

As described above, in the NTSC system, color signals for adjacent frames are in opposite phase to each other, and color signals for every two frames are in phase with each other. However, in the PAL system, color signals for every two frames are in opposite phase to each other, and color signals for every four frames are in phase with each other. That is, if such a three-dimensional Y/C separating circuit is applied to the PAL system, the difference between video signals for every two frames has to be determined in order to detect a motion in a luminance signal, and the difference between video signals for every four frames has to be determined in order to detect a motion in a color signal. As a result, in the case of application to the PAL system, there is a problem that a frame memory having a larger capacity than in the case of application to the NTSC system is required.

An object of the present invention is to provide a three-dimensional Y/C separating circuit that has a high responsibility to a motion in a video signal and can reduce a memory capacity.

DISCLOSURE OF INVENTION

Means for Solving the Problem

A three-dimensional Y/C separating circuit according to an aspect of the present invention includes: a first separating section configured to separate a first correlation luminance signal and a first correlation color signal from a composite video signal using an in-screen correlation of the composite video signal; a first delaying section configured to delay a color signal in the composite video signal by an inversion period thereof to produce a delayed composite video signal; a second separating section configured to separate a second correlation luminance signal and a second correlation color signal from the delayed composite video signal and the composite video signal using the interscreen correlation of the composite video signal; a luminance motion detecting part configured to output a first frame correlation signal containing a luminance motion component obtained by a subtraction processing between the delayed composite video signal and the composite video signal; a first adding section configured to output a mixed video signal containing a color motion component and a luminance component obtained by an addition processing between the delayed composite video signal and the composite video signal; a second delaying section configured to delay the mixed video signal by one frame period and output the delayed mixed video signal; a first subtracting section configured to remove the luminance component by a subtraction processing between an input and an output of the second delaying section and output a second frame correlation signal containing the color motion component; a determining section configured to determine a motion of the composite video signal from the first and second frame correlation signals and output first and second mixing ratio controlling signals; a first mixing section configured to output a luminance signal obtained by mixing the first and second correlation luminance signals in a mixing ratio determined by the first mixing ratio controlling signal; and a second mixing section configured to output a color signal obtained by mixing the first and second correlation color signals in a mixing ratio determined by the second mixing ratio controlling signal.

BEST MODE FOR CARRYING OUT THE INVENTION

In the following, embodiments of the present invention will be described with reference to the drawings.

First Embodiment

Figure 1:
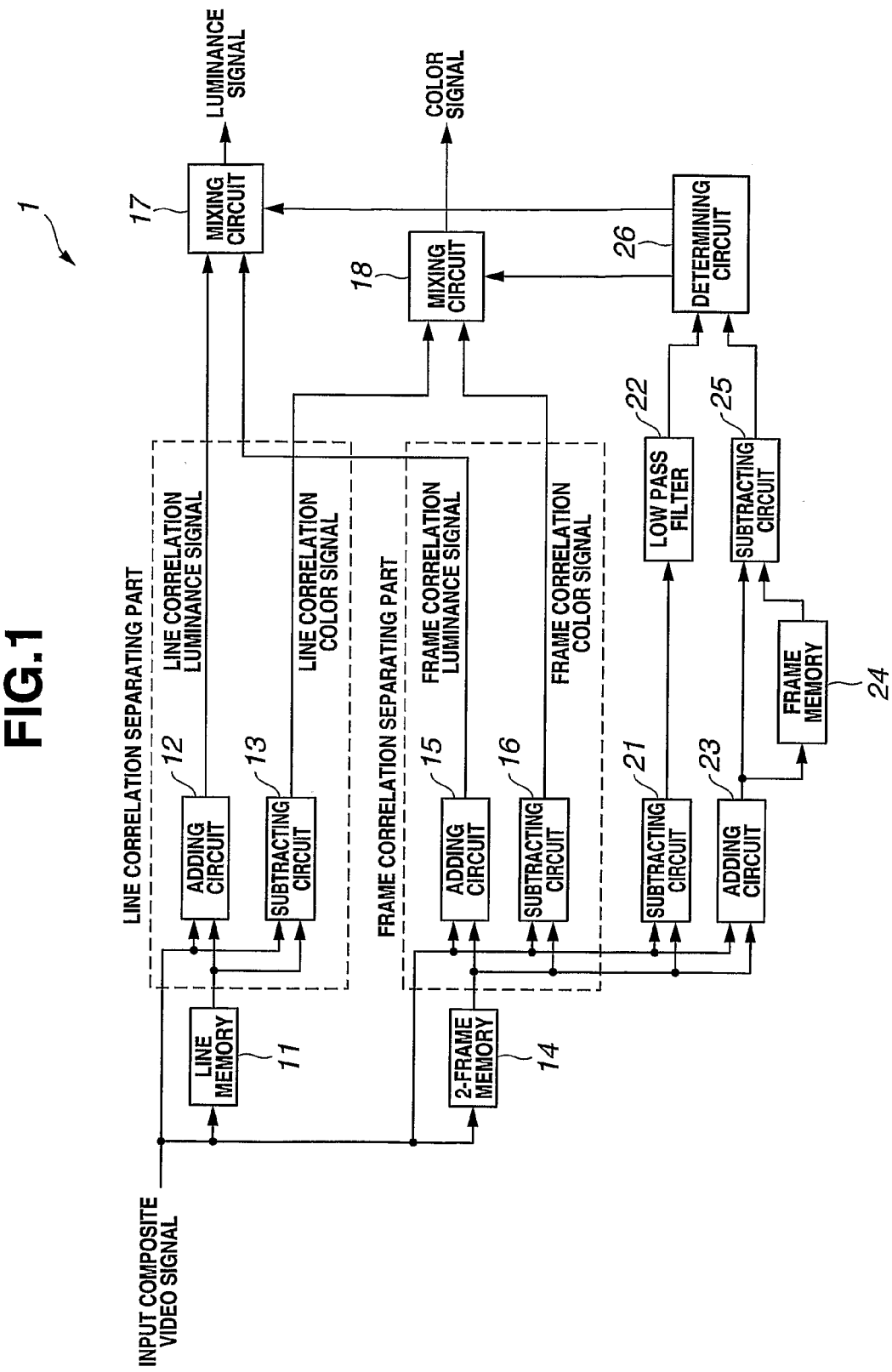
FIG. 1 is a block diagram showing a configuration of a three-dimensional Y/C separating circuit according to a first embodiment.

FIG. 1 is a block diagram showing a configuration of a three-dimensional Y/C separating circuit according to a first embodiment. The three-dimensional Y/C separating circuit according to the present embodiment is used for a processing of a PAL-format composite video signal, for example. In the case of the PAL-format composite video signal, the phase of a color signal is shifted by 90 degrees every frame. In other words, in the PAL system, color signals for every two frames are in opposite phase to each other, and color signals for every four frames are in phase with each other.

As shown in FIG. 1, a three-dimensional Y/C separating circuit 1 has a line memory 11, an adding circuit 12, a subtracting circuit 13, a 2-frame memory 14, an adding circuit 15, a subtracting circuit 16, mixing circuits 17 and 18, a subtracting circuit 21, a low pass filter 22, an adding circuit 23, a frame memory 24, a subtracting circuit 25 and a determining circuit 26.

An input composite video signal containing a luminance signal and a color signal is supplied to the line memory 11, the adding circuit 12, the subtracting circuit 13, the 2-frame memory 14, the adding circuit 15, the subtracting circuit 16, the subtracting circuit 21, and the adding circuit 23. The line memory 11 has a function of delaying the input composite video signal by two horizontal periods. The line memory 11 delays the input composite video signal by two horizontal periods and outputs the delayed composite video signal to the adding circuit 12 and the subtracting circuit 13, which are components of a line correlation separating part.

The adding circuit 12 sums the input composite video signal and the composite video signal delayed by two horizontal periods by the line memory 11, thereby separating a luminance signal component. The adding circuit 12 outputs a line correlation luminance signal, which is the separated luminance signal component, to the mixing circuit 17.

The subtracting circuit 13 performs a subtraction between the input composite video signal and the composite video signal delayed by two horizontal periods by the line memory 11, thereby separating a color signal component. The subtracting circuit 13 outputs a line correlation color signal, which is the separated color signal component, to the mixing circuit 18.

The 2-frame memory 14 has a function of delaying the input composite video signal by two frame periods. The 2-frame memory 14 delays the input composite video signal by two frame periods and outputs the delayed composite video signal to the adding circuit 15, the subtracting circuit 16, the subtracting circuit 21 and the adding circuit 23.

The adding circuit 15, which is a component of a frame correlation separating part, sums the input composite video signal and the composite video signal delayed by two frame periods by the 2-frame memory 14, thereby separating a luminance signal component. The adding circuit 15 outputs a frame correlation luminance signal, which is the separated luminance signal component, to the mixing circuit 17.

The subtracting circuit 16, which is also a component of the frame correlation separating part, performs a subtraction between the input composite video signal and the composite video signal delayed by two frame periods by the 2-frame memory 14, thereby separating a color signal component. The subtracting circuit 16 outputs a frame correlation color signal, which is the separated color signal component, to the mixing circuit 18.

The mixing circuit 17 mixes the input line correlation luminance signal and the input frame correlation luminance signal in a ratio determined by a mixing ratio controlling signal described later and outputs a luminance signal. The mixing circuit 18 mixes the input line correlation color signal and the input frame correlation color signal in a ratio determined by the mixing ratio controlling signal described later and outputs a color signal.

The subtracting circuit 21, which is a component of a luminance motion detecting part, performs a subtraction between the input composite video signal and the composite video signal delayed by two frame periods by the 2-frame memory 14, thereby extracting a luminance signal motion component and a color component, and outputs the luminance signal motion component and the color component to the low pass filter 22.

The low pass filter 22, which is also a component of the luminance motion detecting part, permits a low frequency band component of the input signal to pass through and thus outputs a frame correlation signal containing only the luminance signal motion component to the determining circuit 26.

In the present embodiment, the adding circuit 23, the frame memory 24 and the subtracting circuit 25 form a circuit for detecting a color signal motion component.

The adding circuit 23 sums the input composite video signal and the composite video signal delayed by two frame periods by the 2-frame memory 14, thereby extracting a luminance signal component and a color signal motion component, and outputs the luminance signal component and the color signal motion component to the frame memory 24 and the subtracting circuit 25.

The frame memory 24 delays the input luminance signal component and the input color signal motion component by one frame period and outputs the delayed luminance signal component and color signal motion component to the subtracting circuit 25.

The subtracting circuit 25 determines the difference between the output of the adding circuit 23 and the output of the frame memory 24. Thus, the subtracting circuit 25 determines the difference between the luminance signal components for adjacent frame periods and the difference between the color signal motion components for adjacent frame periods. In this way, the subtracting circuit 25 provides a frame correlation signal containing the luminance signal motion component and the color signal motion component. The subtracting circuit 25 outputs the frame correlation signal containing the luminance signal motion component and the color signal motion component to the determining circuit 26. The subtracting circuit 25 determines the difference between adjacent frame periods, thereby sufficiently attenuating the luminance motion component, thereby providing the color motion component.

The determining circuit 26 produces a mixing ratio controlling signal based on the frame correlation signals being output from the low pass filter 22 and the subtracting circuit 25 and outputs the mixing ratio controlling signal to the mixing circuits 17 and 18.

Now, an operation of such a configuration according to the present embodiment will be described with reference to FIGS. 2 to 5.

The input composite video signal is supplied to the line memory 11, the adding circuit 12, the subtracting circuit 13, the frame memory 14, the adding circuit 15, the subtracting circuit 16, the subtracting circuit 21 and the adding circuit 23. The composite video signal delayed by two horizontal periods by the line memory 11 is supplied to the adding circuit 12 and the subtracting circuit 13. The adding circuit 12 and the subtracting circuit 13 perform a line correlation separating processing. The adding circuit 12 outputs the line correlation luminance signal to the mixing circuit 17, and the subtracting circuit 13 outputs the line correlation color signal to the mixing circuit 18.

On the other hand, the composite video signal delayed by two frame periods by the 2-frame memory 14 is supplied to the adding circuit 15 and the subtracting circuit 16. The adding circuit 15 and the subtracting circuit 16 perform a frame correlation separating processing. The adding circuit 15 outputs the frame correlation luminance signal to the mixing circuit 17, and the subtracting circuit 16 outputs the frame correlation color signal to the mixing circuit 18.

The composite video signal delayed by two frame periods by the frame memory 14 is supplied also to the subtracting circuit 21 and the adding circuit 23, and motion detection for the luminance signal and the color signal is performed.

Motion detection for the luminance signal is performed by the subtracting circuit 21 and the low pass filter 22. The subtracting circuit 21 determines the difference between the input composite video signal and the composite video signal delayed by two frame periods and outputs the difference to the low pass filter 22. The low pass filter 22 extracts only a low frequency band component from the output of the subtracting circuit 21 and outputs the extracted low frequency band component to the determining circuit 26 as the frame correlation signal containing the luminance signal motion component.

On the other hand, motion detection for the color signal is performed by the adding circuit 23, the frame memory 24 and the subtracting circuit 25. The adding circuit 23 sums the input composite video signal and the composite video signal delayed by two frame periods to produce the luminance signal component and the color signal motion component. The adding circuit 23 outputs the luminance signal component and the color signal motion component to the frame memory 24 and the subtracting circuit 25.

The luminance signal component and the color signal motion component being input to the frame memory 24 are delayed by one frame and output to the subtracting circuit 25. The subtracting circuit 25 determines the difference between luminance signal components for adjacent frames and the difference between color signal motion components for adjacent frames. The output of the adding circuit 23 contains not only the color signal motion component but also the luminance signal component. However, by the subtraction processing in the subtracting circuit 25, the frame correlation signal containing the luminance signal motion component and the color signal motion component is determined. In this way, the subtracting circuit 25 can sufficiently attenuate the luminance motion component by the subtraction processing between luminance signal components for adjacent frames. The subtracting circuit 25 outputs the frame correlation signal to the determining circuit 26.

Now, operations of the adding circuit 23, the frame memory 24 and the subtracting circuit 25 will be described with reference to waveform diagrams.

Figure 2:
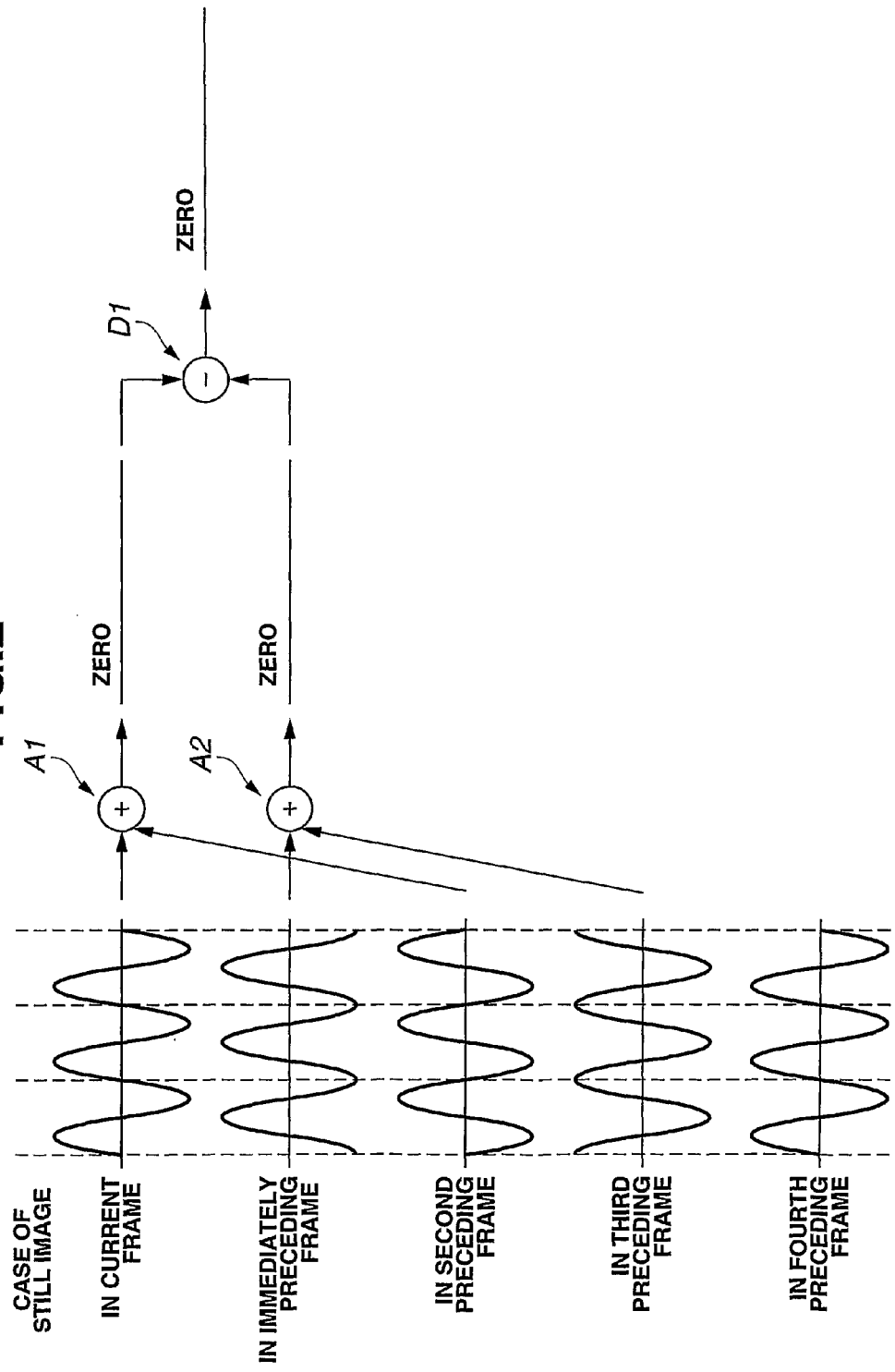
FIG. 2 is a waveform diagram for illustrating variations of color signals in a case of a still image.

FIG. 2 is a waveform diagram for illustrating variations of color signals in a case of a still image. Here, it is assumed that color signals shown in FIG. 2 are input to the adding circuit 23. The adding circuit 23 performs an addition operation A1 to sum a color signal in a current frame and a color signal in a second preceding frame and outputs a color signal motion component. As described above, in the PAL system, color signals for every two frames are in opposite phase to each other. Therefore, in the case of the still image, the color signal motion component being output from the adding circuit 23 is zero. The frame memory 24 delays the output of the adding circuit 23 by one frame period and provides the delayed output. The addition operation for the current frame is referred to as A1, and an addition operation for an immediately preceding frame is referred to as A2. The frame memory 24 outputs the result of the addition operation A2. That is, the frame memory 24 outputs a color signal motion component, which is the result of addition of a color signal in the immediately preceding frame and a color signal in a third preceding frame shown in FIG. 2. The color signal motion component, which is the result of the addition operation A2, is zero in the case of the still image. A frame correlation signal calculated by a subtraction operation D1 by the subtracting circuit 25, which is a color signal motion component, is also zero. The subtracting circuit 25 outputs the frame correlation signal.

Figure 3:
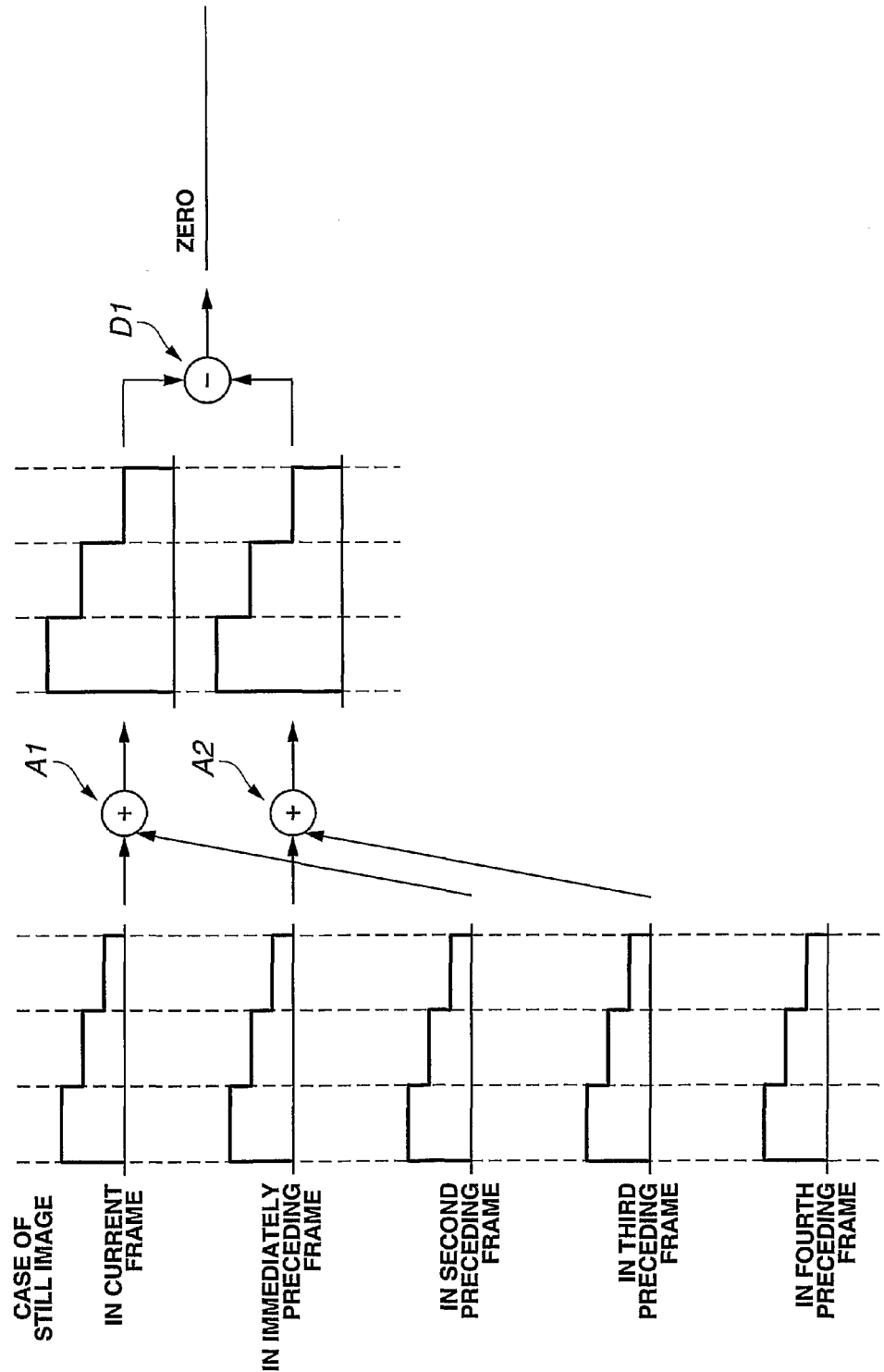
FIG. 3 is a waveform diagram for illustrating variations of luminance signals in the case of the still image.

FIG. 3 is a waveform diagram for illustrating variations of luminance signals in the case of the still image. Here, it is assumed that luminance signals shown in FIG. 3 are input to the adding circuit 23. The adding circuit 23 performs the addition operation A1 to sum a luminance signal in the current frame and a luminance signal in the second preceding frame and outputs the result of the addition operation. The frame memory 24 delays the output of the adding circuit 23 by one frame period and provides the delayed output. The frame memory 24 outputs the result of the addition operation A2. That is, the frame memory 24 outputs a luminance signal component, which is the result of addition of a luminance signal in the immediately preceding frame and a luminance signal in the third preceding frame shown in FIG. 3. The subtracting circuit 25 performs the subtraction operation D1 to determine the difference between the output of the adding circuit 23 and the output of the frame memory 24 and outputs a frame correlation signal, which is a luminance signal motion component. In the case of the still image, the outputs of the adding circuit 23 and the frame memory 24 agree with each other, and the luminance signal motion component output from the subtracting circuit 25 is zero.

Figure 4:
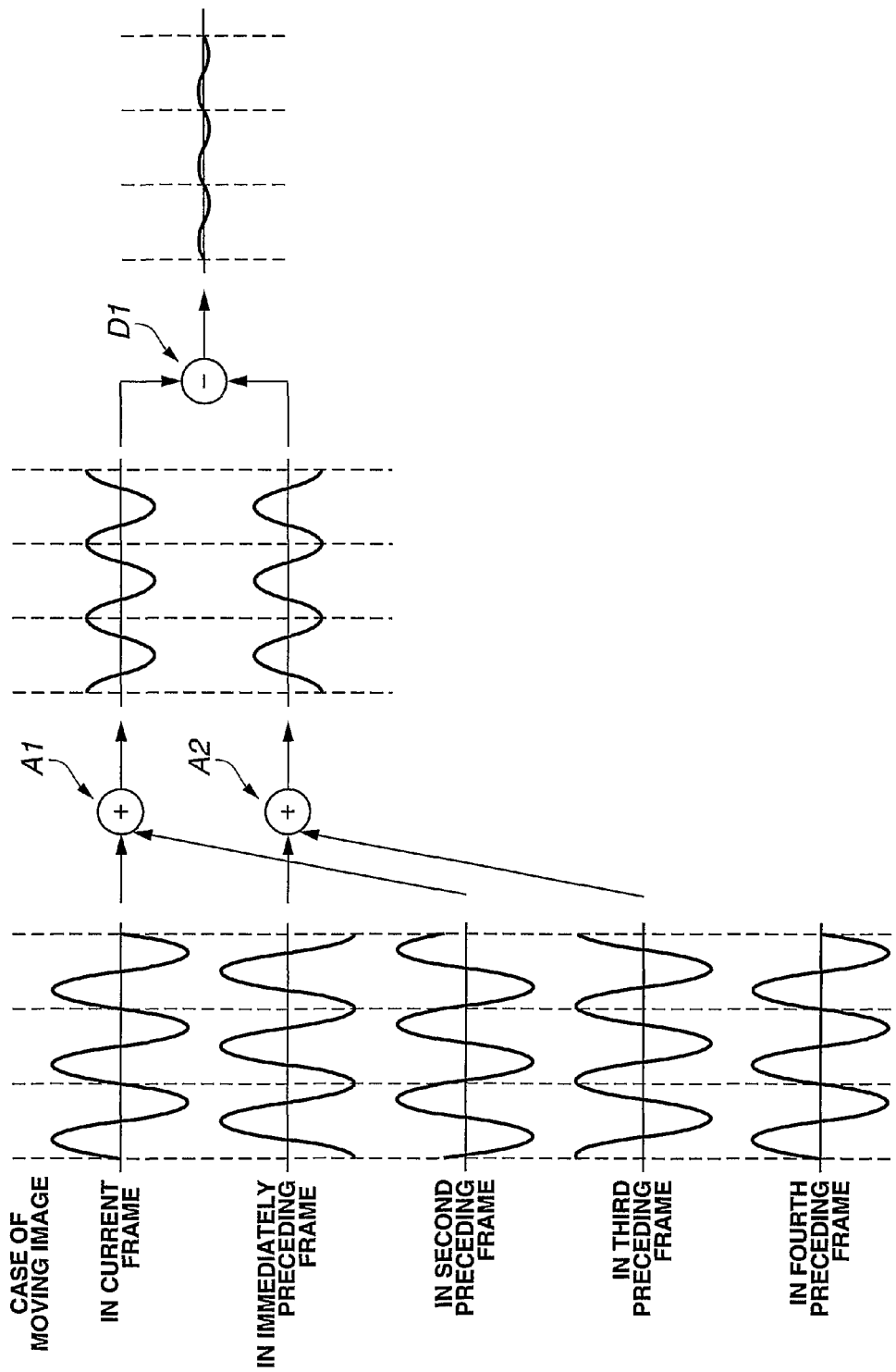
FIG. 4 is a waveform diagram for illustrating variations of color signals in a case of a moving image.

FIG. 4 is a waveform diagram for illustrating variations of color signals in a case of a moving image. Here, it is assumed that color signals shown in FIG. 4 are input to the adding circuit 23. The adding circuit 23 performs the addition operation A1 to sum a color signal in the current frame and a color signal in the second preceding frame and outputs a color signal motion component. The frame memory 24 delays the output of the adding circuit 23 by one frame period and provides the delayed output. The frame memory 24 outputs the result of the addition operation A2. That is, the frame memory 24 outputs a color signal motion component, which is the result of addition of a color signal in the immediately preceding frame and a color signal in the third preceding frame shown in FIG. 4. The subtracting circuit 25 performs the subtraction operation D1 to determine the difference between the output of the adding circuit 23 and the output of the frame memory 24 and outputs a frame correlation signal, which is a color signal motion component.

Figure 5:
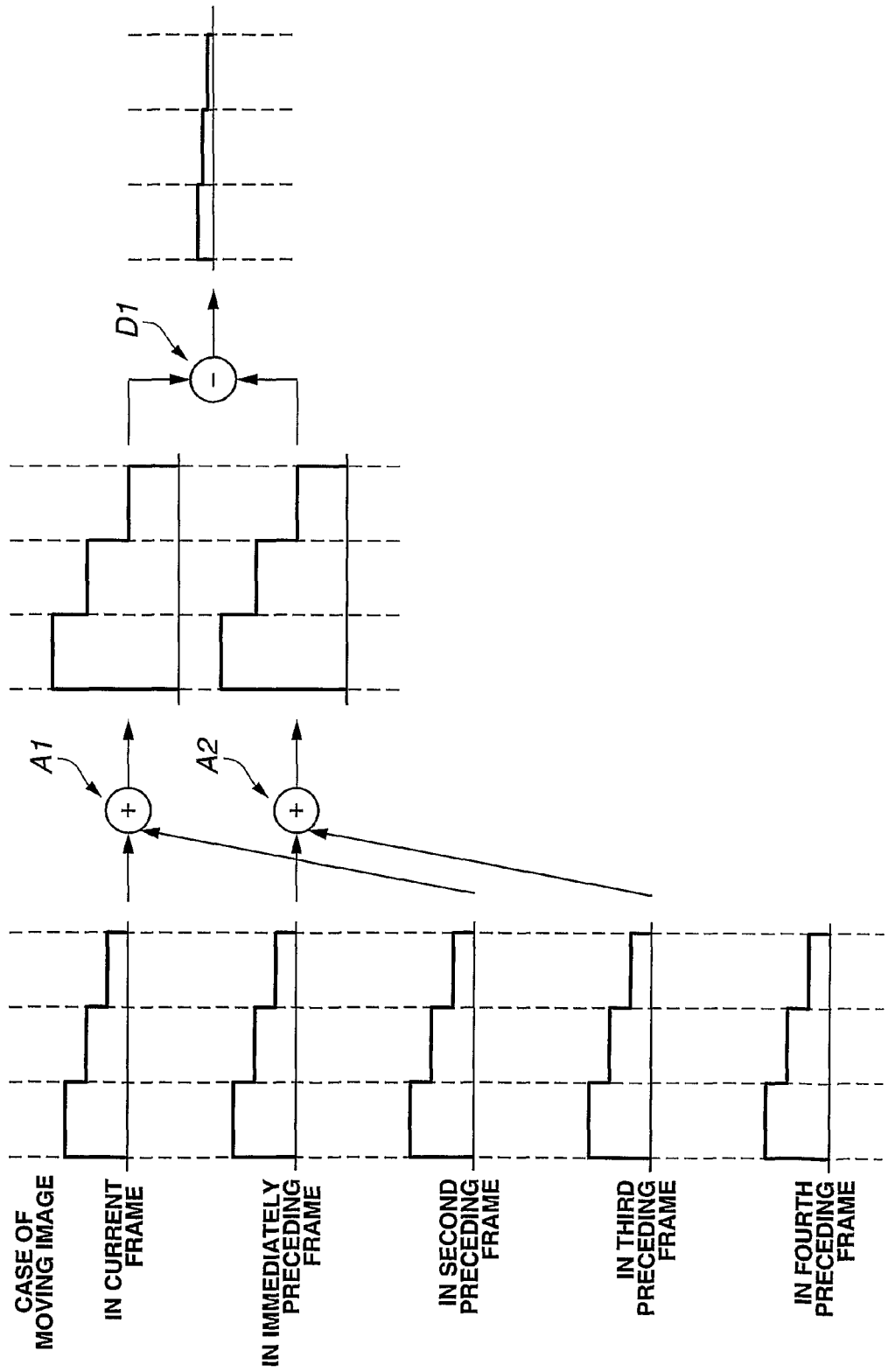
FIG. 5 is a waveform diagram for illustrating variations of luminance signals in the case of the moving image.

FIG. 5 is a waveform diagram for illustrating variations of luminance signals in the case of the moving image. Here, it is assumed that luminance signals shown in FIG. 5 are input to the adding circuit 23. The adding circuit 23 performs the addition operation A1 to sum a luminance signal in the current frame and a luminance signal in the second preceding frame and outputs the result of the addition operation. The frame memory 24 delays the output of the adding circuit 23 by one frame period and provides the delayed output. The frame memory 24 outputs the result of the addition operation A2. That is, the frame memory 24 outputs a luminance signal component, which is the result of addition of a luminance signal in the immediately preceding frame and a luminance signal in the third preceding frame shown in FIG. 5. The subtracting circuit 25 performs the subtraction operation D1 to determine the difference between the output of the adding circuit 23 and the output of the frame memory 24 and outputs a frame correlation signal, which is a luminance signal motion component.

The frame correlation signals thus determined are input to the determining circuit 26. The determining circuit 26 produces a mixing ratio controlling signal based on the frame correlation signals being output from the subtracting circuit 25 and the frame correlation signal being output from the low pass filter 22. The produced mixing ratio controlling signal is output to the mixing circuits 17 and 18.

The mixing circuit 17 mixes the input line correlation luminance signal and the input frame correlation luminance signal in a mixing ratio determined by the mixing ratio controlling signal and outputs a luminance signal. On the other hand, the mixing circuit 18 mixes the input line correlation color signal and the input frame correlation color signal in a mixing ratio determined by the mixing ratio controlling signal and outputs a color signal.

As described earlier, the conventional three-dimensional Y/C separating circuit available for the PAL system has a memory for four frames and detects a color signal motion component by determining the difference between composite video signals for every four frames for which the color signals are in phase with each other. However, the three-dimensional Y/C separating circuit according to the present embodiment has a memory for two frames and can detect a color signal motion component from composite video signals for every two frames, so that the memory capacity can be reduced.

Furthermore, the conventional three-dimensional Y/C separating circuit available for the PAL system separates the color signal and the luminance signal using video signals for every two frames and performs motion detection for the color signal based on the difference between every four frames. Thus, to accurately detect the color signal motion component, a temporal filter is used. However, the three-dimensional Y/C separating circuit according to the present embodiment does not require any temporal filter because the frame correlation signals contain the color signal motion components for every two frames. As a result, motion detection for the color signal requires only the current frame correlation, and therefore, the responsibility to a motion in the input video signal is improved.

In this way, the three-dimensional Y/C separating circuit according to the present embodiment has an improved responsibility to a motion in a video signal and can reduce a memory capacity.

(Modification 1)

Figure 6:
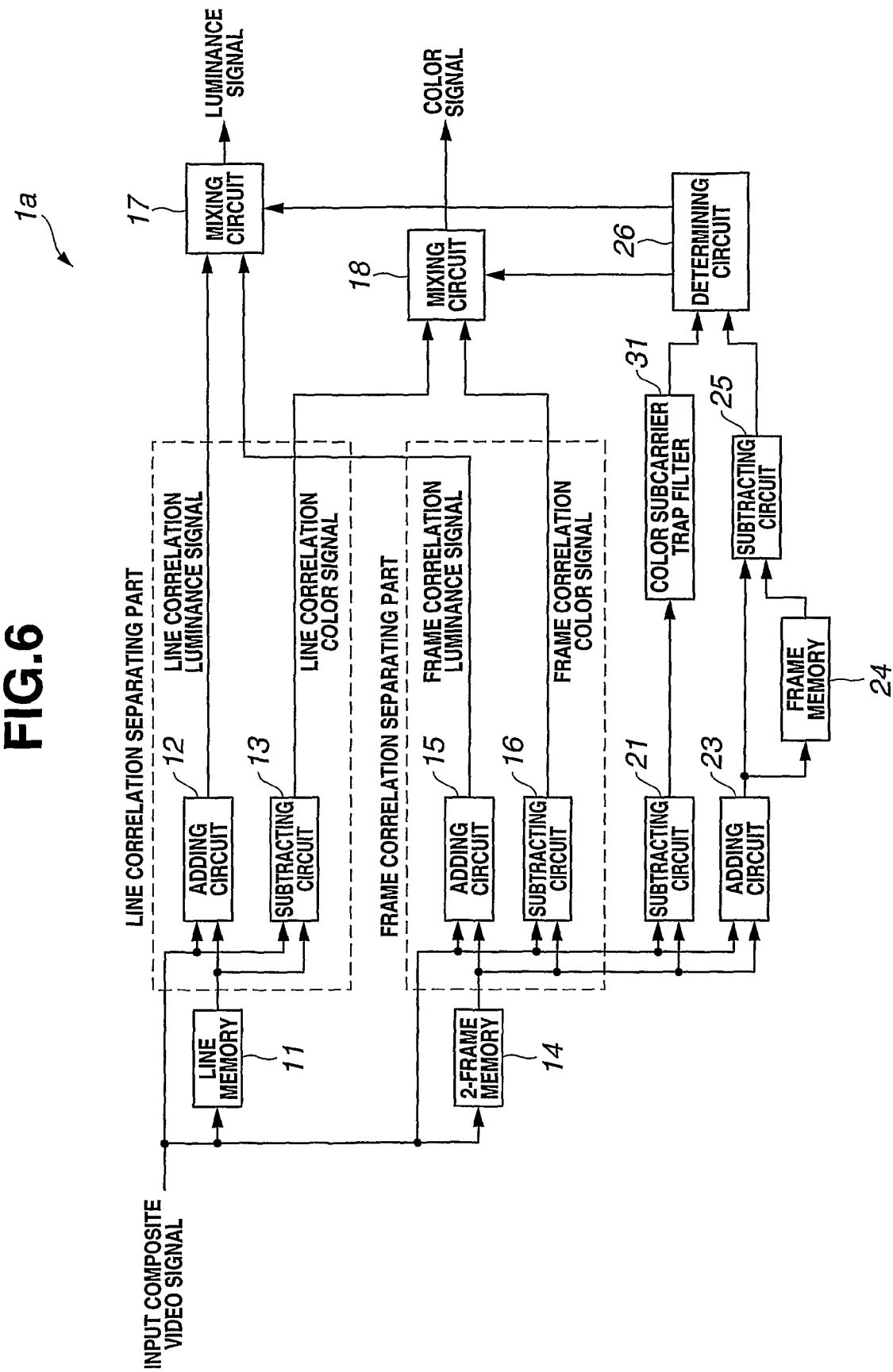
FIG. 6 is a block diagram showing a modification 1 of the three-dimensional Y/C separating circuit according to the first embodiment.

FIG. 6 is a block diagram showing a modification 1 of the three-dimensional Y/C separating circuit 1 according to the first embodiment. In FIG. 6, the same components as those in FIG. 1 are denoted by the same reference numerals, and descriptions thereof will be omitted.

A three-dimensional Y/C separating circuit 1a shown in FIG. 6 has a color subcarrier trap filter 31 instead of the low pass filter 22 shown in FIG. 1. The output of the subtracting circuit 21 is supplied to the color subcarrier trap filter 31. The color subcarrier trap filter 31 removes only a color subcarrier, which is a color signal component, and outputs a frame correlation signal, which contains only a luminance signal motion component, to the determining circuit 26.

If the low pass filter 22 is replaced with the color subcarrier trap filter 31, the color subcarrier trap filter 31 removes only the color signal component, and therefore, the luminance signal motion component, which lies in a high frequency band, is not removed and can be detected.

Therefore, the three-dimensional Y/C separating circuit 1a according to the modification 1 can detect the luminance signal motion component with high precision.

(Modification 2)

Figure 7:
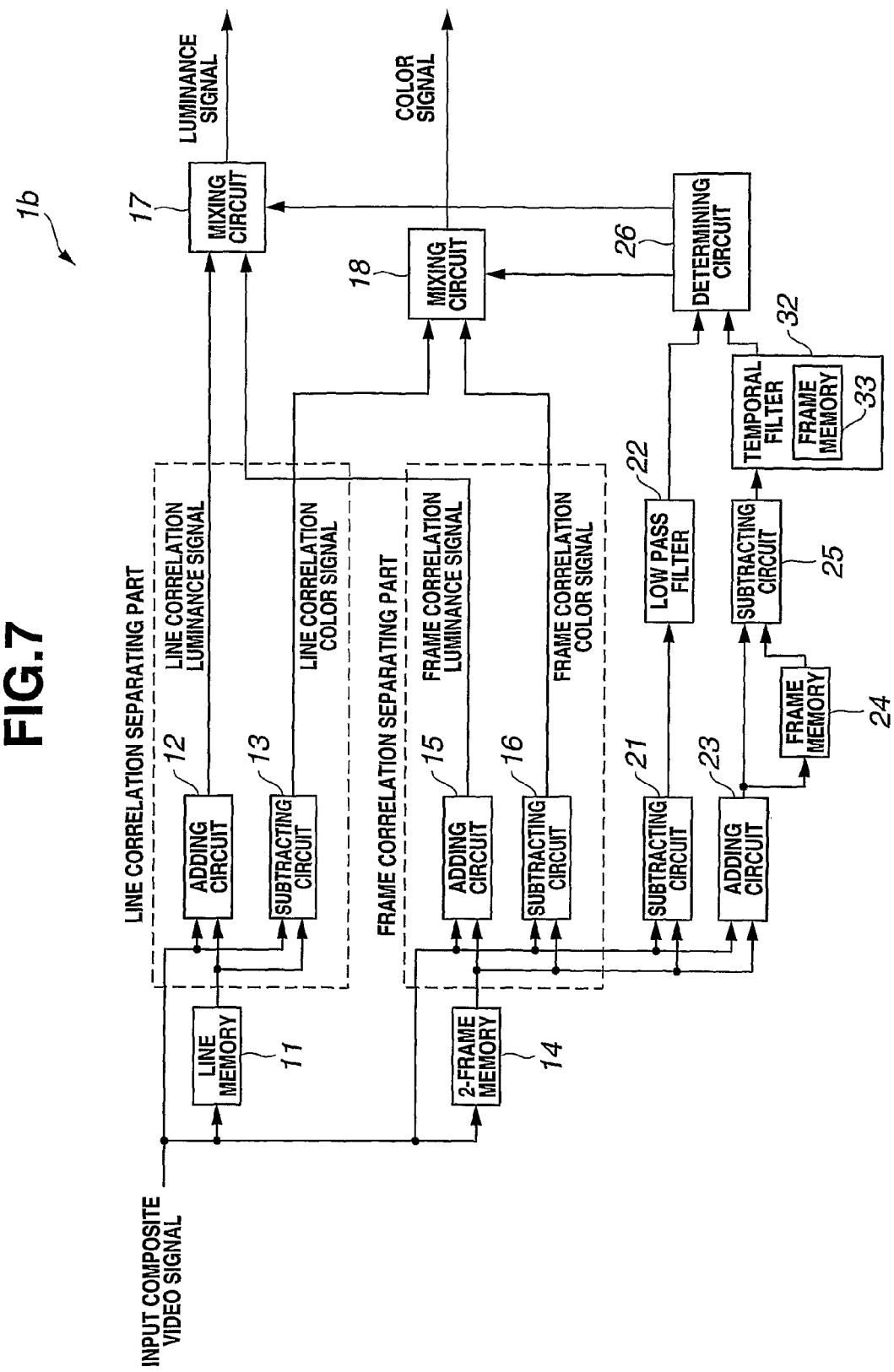
FIG. 7 is a block diagram showing a modification 2 of the three-dimensional Y/C separating circuit according to the first embodiment.

FIG. 7 is a block diagram showing a modification 2 of the three-dimensional Y/C separating circuit 1 according to the first embodiment. In FIG. 7, the same components as those in FIG. 1 are denoted by the same reference numerals, and descriptions thereof will be omitted.

A three-dimensional Y/C separating circuit 1b shown in FIG. 7 has the same configuration as shown in FIG. 1 except that a temporal filter 32 and a frame memory 33 are additionally provided. The frame correlation signal being output from the subtracting circuit 25 is input to the temporal filter 32. The frame correlation signal being input to the temporal filter 32 is delayed by one frame period by the frame memory 33.

The temporal filter 32 compares the magnitude of the frame correlation signal from the subtracting circuit 25 and the magnitude of the frame correlation signal delayed by one frame period by the frame memory 33 to detect the higher frame correlation and outputs the signal of the higher frame correlation to the determining circuit 26. Since the temporal filter 32 selects and outputs a frame correlation for which a color signal motion is larger, the color signal motion component can be detected with high precision.

Therefore, the three-dimensional Y/C separating circuit 1b according to the modification 2 can improve the precision of the motion detection for a moving image.

(Modification 3)

Figure 8:
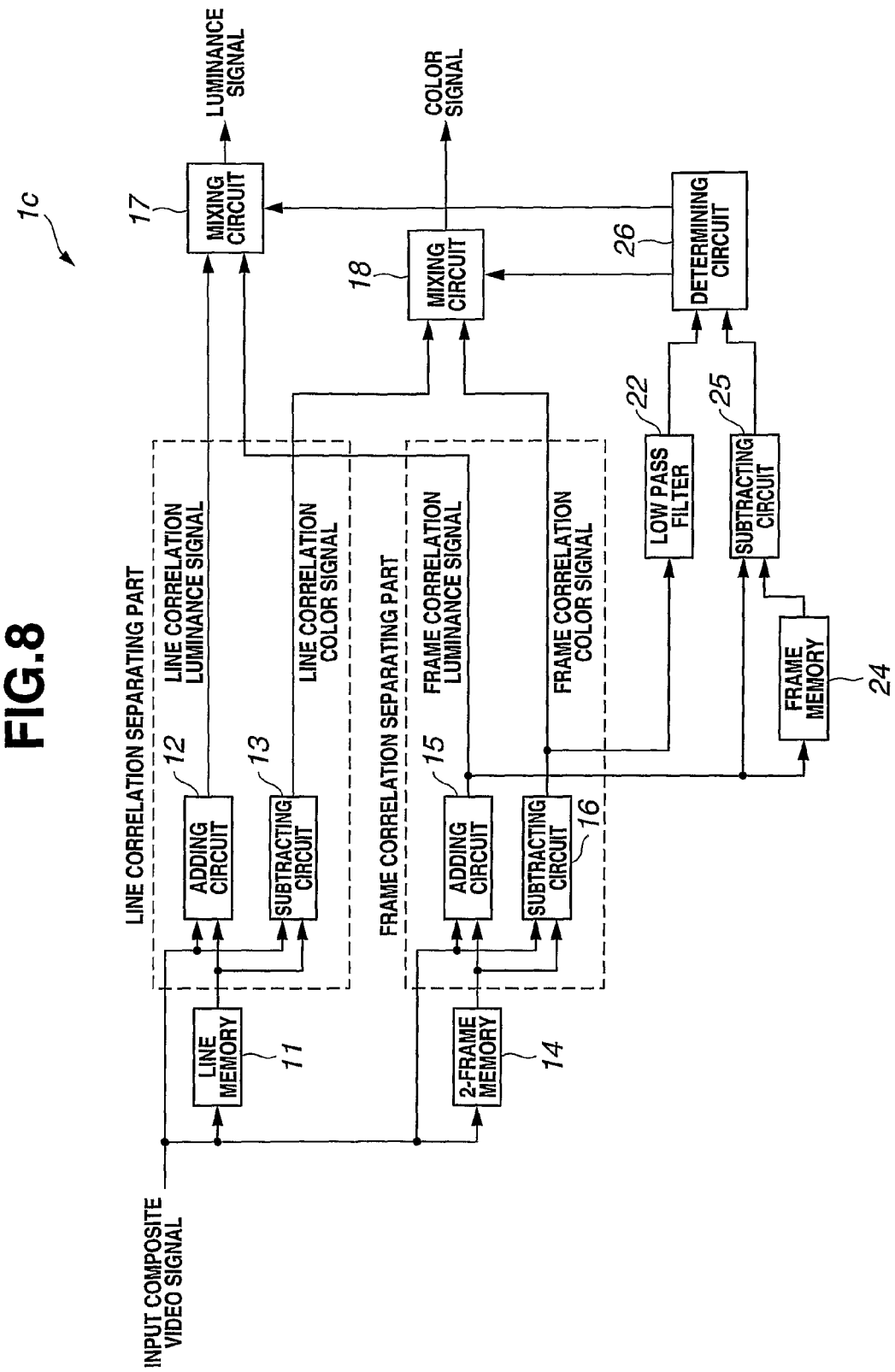
FIG. 8 is a block diagram showing a modification 3 of the three-dimensional Y/C separating circuit according to the first embodiment.

FIG. 8 is a block diagram showing a modification 3 of the three-dimensional Y/C separating circuit 1 according to the first embodiment. In FIG. 8, the same components as those in FIG. 1 are denoted by the same reference numerals, and descriptions thereof will be omitted.

A three-dimensional Y/C separating circuit 1c shown in FIG. 8 has the same configuration as shown in FIG. 1 except that the output of the adding circuit 15 is used also as the output of the adding circuit 23, and the output of the subtracting circuit 16 is used also as the output of the subtracting circuit 21.

As shown in FIG. 1, the input composite video signal and the composite video signal delayed by two frame periods output from the frame memory 14 are input to the adding circuit 15 and the adding circuit 23. That is, the same composite video signals are input to the adding circuit 15 and the adding circuit 23. Therefore, the output of the adding circuit 23 is the same as the output of the adding circuit 15.

Thus, the adding circuit 15 is configured to output the frame correlation luminance signal determined from the input composite video signal and the composite video signal delayed by two frame periods by the 2-frame memory 14 not only to the mixing circuit 17 but also to the frame memory 24 and the subtracting circuit 25. As a result, the adding circuit 23 can be omitted.

Similarly, the output of the subtracting circuit 21 is the same as the output of the subtracting circuit 16. Thus, the subtracting circuit 16 is configured to output the frame correlation color signal determined from the input composite video signal and the composite video signal delayed by two frame periods by the 2-frame memory 14 not only to the mixing circuit 18 but also to the low pass filter 22. As a result, the subtracting circuit 21 can be omitted.

Therefore, for the three-dimensional Y/C separating circuit 1c according to the modification 3, the subtracting circuit 21 and the adding circuit 23 can be omitted, so that the circuit size can be reduced.

Second Embodiment

Figure 9:
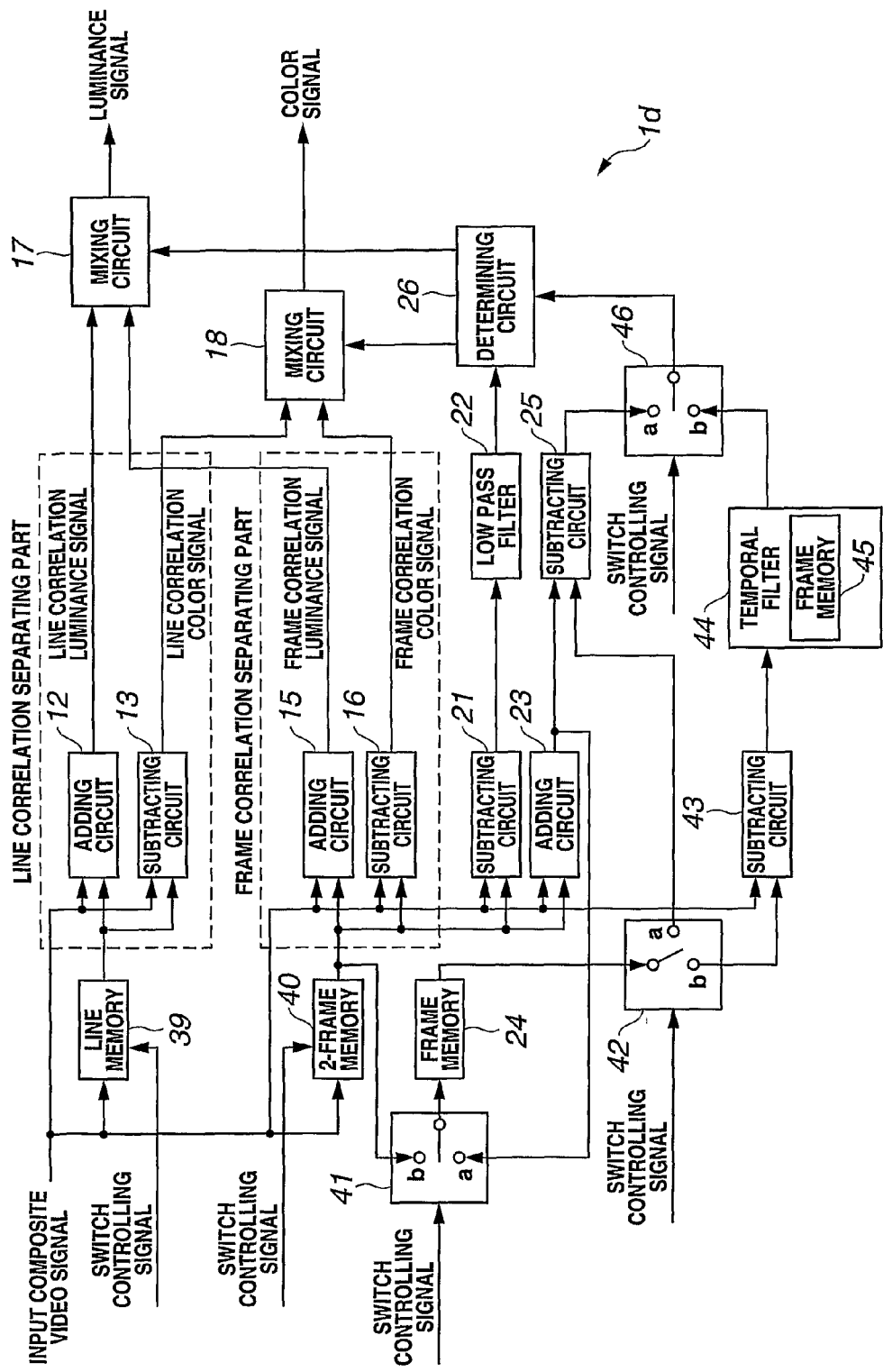
FIG. 9 is a block diagram showing a configuration of a three-dimensional Y/C separating circuit according to a second embodiment.

FIG. 9 is a block diagram showing a configuration of a three-dimensional Y/C separating circuit according to a second embodiment. In FIG. 9, the same components as those in FIG. 1 are denoted by the same reference numerals, and descriptions thereof will be omitted. A three-dimensional Y/C separating circuit 1d according to the present embodiment can be used for processing of both PAL-format and NTSC-format composite video signals, for example. In the case of the NTSC-format composite video signal, the phase of a color signal is shifted by 180 degrees every frame. In other words, in the NTSC system, color signals for adjacent frames are in opposite phase to each other, and color signals for every two frames are in phase with each other.

The present embodiment differs from the first embodiment in that the line memory 11 is replaced with a line memory 39, the 2-frame memory 14 is replaced with a 2-frame memory 40, and a switch 41, a switch 42, a subtracting circuit 43, a temporal filter 44, a frame memory 45 and a switch 46 are additionally provided.

In addition, in the present embodiment, a switch controlling signal is input to the line memory 39, the 2-frame memory 40, the switch 41, the switch 42 and the switch 46. The switch controlling signal is used to control switching between the PAL system and the NTSC system.

The line memory 39 has a function of delaying the input composite video signal by one horizontal period or two horizontal periods based on the switch controlling signal. The line memory 39 delays the input composite video signal by two horizontal periods if a switch controlling signal designating the PAL system is supplied thereto and delays the input composite video signal by one horizontal period if a switch controlling signal designating the NTSC system is supplied thereto. The line memory 39 outputs the input composite video signal delayed by one horizontal period or two horizontal periods to the adding circuit 12 and the subtracting circuit 13.

The 2-frame memory 40 has a function of delaying the input composite video signal by one frame period or two frame periods based on the switch controlling signal. The 2-frame memory 40 delays the input composite video signal by two frame periods if a switch controlling signal designating the PAL system is supplied thereto and delays the input composite video signal by one frame period if a switch controlling signal designating the NTSC system is supplied thereto. The 2-frame memory 40 outputs the input composite video signal delayed by one horizontal period or two horizontal periods to the adding circuit 15, the subtracting circuit 16, the subtracting circuit 21, the adding circuit 23 and the switch 41.

The switch 41 receives the output of the 2-frame memory 40 at a terminal a thereof. The switch 41 also receives the output of the adding circuit 23 at a terminal b thereof. The switch 41 selects the terminal a if a switch controlling signal designating the PAL system is supplied thereto and selects the terminal b if a switch controlling signal designating the NTSC system is supplied thereto, and outputs the signal supplied to the selected terminal to the frame memory 24.

The switch 42 receives the output of the frame memory 24. If a switch controlling signal designating the PAL system is supplied to the switch 42, the switch 42 selects a terminal a and outputs the signal supplied to the selected terminal to the subtracting circuit 25. On the other hand, if a switch controlling signal designating the NTSC system is supplied to the switch 42, the switch 42 selects the terminal b and outputs the signal supplied to the selected terminal to the subtracting circuit 43.

The subtracting circuit 43, which is included in a color motion detecting part, determines the difference between the input composite video signal and the composite video signal delayed by two frame periods and detects a color signal motion component. The subtracting circuit 43 outputs a frame correlation signal, which is the detected color signal motion component, to the temporal filter 44. The frame correlation signal being input to the temporal filter 44 is delayed by one frame period by the frame memory 45.

The temporal filter 44, which is also included in the color motion detecting part, compares the magnitude of the frame correlation signal from the subtracting circuit 43 and the magnitude of the frame correlation signal delayed by one frame period by the frame memory 45 to detect the higher frame correlation and outputs the signal of the higher frame correlation to the switch 46.

The switch 46 receives a frame correlation signal output from the subtracting circuit 25 at a terminal a thereof. The switch 46 also receives the frame correlation signal being output from the temporal filter 44 at a terminal b thereof. The switch 46 selects the terminal a if a switch controlling signal designating the PAL system is supplied thereto and selects the terminal b if a switch controlling signal designating the NTSC system is supplied thereto, and outputs the frame correlation signal supplied to the selected terminal to the determining circuit 26.

Next, an operation of such a configuration according to the present embodiment will be described.

First, a case will be described where a PAL-format composite video signal is input. That is, a switch controlling signal designating the PAL system is supplied to the 2-frame memory 40, the switch 41, the switch 42 and the switch 46. The 2-frame memory 40 outputs a composite video signal delayed by two frame periods based on the switch controlling signal. The switch 41, the switch 42, and the switch 46 select the terminal a based on the switch controlling signal.

The output of the adding circuit 23 is supplied to the subtracting circuit 25 and to the frame memory 24 via the terminal a of the switch 41. A luminance signal component and a color signal motion component delayed by one frame period by the frame memory 24 are input to the subtracting circuit 25 via the terminal a of the switch 42.

The subtracting circuit 25 produces a frame correlation signal containing the color signal motion component from the difference between the output of the adding circuit 23 and the output of the frame memory 24. The frame correlation signal produced by the subtracting circuit 25 is input to the determining circuit 26 via the terminal a of the switch 46.

Next, a case will be described where an NTSC-format composite video signal is input. That is, a switch controlling signal designating the NTSC system is supplied to the 2-frame memory 40, the switch 41, the switch 42 and the switch 46. The 2-frame memory 40 outputs a composite video signal delayed by one frame period based on the switch controlling signal. The switch 41, the switch 42, and the switch 46 select the terminal b based on the switch controlling signal.

The video composite signal delayed by one frame period by the 2-frame memory 40 is input to the adding circuit 15 and the subtracting circuit 16, which are included in a frame correlation separating part. As described above, in the case of the NTSC system, color signals for adjacent frames are in opposite phase to each other, so that the adding circuit 15 detects a frame correlation luminance signal, and the subtracting circuit 16 detects a frame correlation color signal.

Furthermore, the video composite signal delayed by one frame period by the 2-frame memory 40 is input to the frame memory 24 via the terminal b of the switch 41. The composite video signal further delayed by one frame period by the frame memory 24 is input to the subtracting circuit 43 via the terminal b of the switch 42. That is, the input video signal and the video composite signal delayed by two frame periods are input to the subtracting circuit 43. As described above, in the case of the NTSC system, color signals for every two frames are in phase with each other, so that the subtracting circuit 43 detects a frame correlation signal containing a color signal motion component and outputs the signal to the temporal filter 44.

The frame memory 45 delays the frame correlation signal from the temporal filter 44 by one frame period, and the frame correlation signal delayed by one frame period is output to the temporal filter 44.

The temporal filter 44 compares the magnitude of the frame correlation signal from the subtracting circuit 43 and the magnitude of the frame correlation signal from the frame memory 45 to detect the larger frame correlation signal. The detected frame correlation signal is input to the determining circuit 26 via the terminal b of the switch 46.

The remainder of the operation is the same as in the first embodiment. The mixing circuit 17 outputs a luminance signal, and the mixing circuit 18 outputs a color signal.

Conventional three-dimensional Y/C separating circuits available both for the PAL system and the NTSC system have a problem that the capacity of the frame memory depends on the PAL system, and the memory capacity and the development cost are high. However, for the three-dimensional Y/C separating circuit 1d according to the present embodiment, the memory capacity for the PAL system can be reduced, so that the total memory capacity of the three-dimensional Y/C separating circuit can be reduced.

The modification shown in FIG. 6 can be applied to the present embodiment. That is, the low pass filter 22 shown in FIG. 9 can be replaced with a color subcarrier trap filter. In that case, as in the modification 1, a luminance signal motion component can be detected with high precision.

Furthermore, the modification shown in FIG. 7 can be applied to the present embodiment. That is, the temporal filter 32 and the frame memory 33 shown in FIG. 7 can be added to the configuration shown in FIG. 9. The temporal filter 32 is added to the output stage of the subtracting circuit 25 shown in FIG. 9. The temporal filter 32 compares the magnitude of the frame correlation signals being input from the subtracting circuit 25 and the frame memory 33 and supplies the higher frame correlation signal to the terminal a of the switch 46. Thus, as in the modification 2, the precision of the motion detection for a moving image can be improved.

Furthermore, the modification shown in FIG. 8 can be applied to the present embodiment. The adding circuit 15 supplies the output frame correlation luminance signal to the mixing circuit 17 and to the terminal a of the switch 41 and the subtracting circuit 25. On the other hand, the subtracting circuit 16 supplies the output frame correlation color signal to the mixing circuit 18 and to the low pass filter 22. Thus, as in the modification 3, the subtracting circuit 21 and the adding circuit 23 can be omitted, and the circuit size can be reduced.

The present invention is not limited to the embodiments described above, and various modifications and alterations can be made without departing from the spirit of the present invention.

The invention claimed is:

1. A three-dimensional Y/C separating circuit, comprising:
a first separating section configured to separate a first correlation luminance signal and a first correlation color signal from a composite video signal using an in-screen correlation of the composite video signal;
a first delaying section configured to delay a color signal in the composite video signal by an inversion period thereof to produce a delayed composite video signal;
a second separating section configured to separate a second correlation luminance signal and a second correlation color signal from the delayed composite video signal and the composite video signal using the interscreen correlation of the composite video signal;
a luminance motion detecting part configured to output a first frame correlation signal containing a luminance motion component obtained by a subtraction processing between the delayed composite video signal and the composite video signal;
a first adding section configured to output a mixed video signal containing a color motion component and a luminance component obtained by an addition processing between the delayed composite video signal and the composite video signal;
a second delaying section configured to delay the mixed video signal by one frame period and output the delayed mixed video signal;
a first subtracting section configured to remove the luminance component by a subtraction processing between an input and an output of the second delaying section and output a second frame correlation signal containing the color motion component;
a determining section configured to determine a motion of the composite video signal from the first and second frame correlation signals and output first and second mixing ratio controlling signals;
a first mixing section configured to output a luminance signal obtained by mixing the first and second correlation luminance signals in a mixing ratio determined by the first mixing ratio controlling signal; and
a second mixing section configured to output a color signal obtained by mixing the first and second correlation color signals in a mixing ratio determined by the second mixing ratio controlling signal.

2. The three-dimensional Y/C separating circuit according to claim 1, further comprising:
a first switching section configured to, based on a switch controlling signal that indicates whether the composite video signal is a signal according to a first system or a signal according to a second system, select and output an output of the first adding section to the second delaying section when the composite video signal input is a signal according to the first system and select and output an output of the first delaying section to the second delaying section when the composite video signal input is a signal according to a second system;
a color motion detecting section configured to output a third frame correlation signal containing a color motion component obtained by a subtraction processing between the composite video signal and the composite video signal delayed by two frame periods;
a second switching section configured to, based on the switch controlling signal, output an output of the second delaying section to the first subtracting section when the composite video signal input is a signal according to the first system and output the output of the second delaying section to the color motion detecting section when the composite video signal input is a signal according to the second system; and
a third switching section configured to, based on the switch controlling signal, select and output an output of the first subtracting section to the determining section when the composite video signal input is a signal according to the first system and select and output an output of the color motion detecting section to the determining section when the composite video signal input is a signal according to the second system.

3. The three-dimensional Y/C separating circuit according to claim 1, wherein the luminance motion detecting part removes the color component with a low pass filter or a color subcarrier trap filter.

4. The three-dimensional Y/C separating circuit according to claim 1, further comprising:
a third delaying section configured to delay the second frame correlation signal by one frame period; and
a first temporal filter configured to compare the magnitude of the color motion component of the second frame correlation signal between adjacent frames and output the second frame correlation signal containing the larger color motion component.

5. The three-dimensional Y/C separating circuit according to claim 1, wherein the second separating section has a second adding section and a second subtracting section,
the luminance motion detecting part performs the subtraction processing using the second subtracting section of the second separating section, and
the first adding section performs the addition processing using the second adding section of the second separating section.

6. The three-dimensional Y/C separating circuit according to claim 1, wherein the first separating section separates the first correlation luminance signal by performing an addition processing between video signals in different lines in a screen.

7. The three-dimensional Y/C separating circuit according to claim 1, wherein the first separating section separates the first correlation color signal by performing a subtraction processing between video signals in different lines in a screen.

8. The three-dimensional Y/C separating circuit according to claim 1, wherein the second separating section separates the second correlation luminance signal by performing an addition processing between the delayed composite video signal and the composite video signal.

9. The three-dimensional Y/C separating circuit according to claim 1, wherein the second separating section separates the second correlation color signal by performing a subtraction processing between the delayed composite video signal and the composite video signal.

10. The three-dimensional Y/C separating circuit according to claim 2, wherein the color motion detecting section has:
a third subtracting section configured to perform a subtraction processing between the composite video signal and the composite video signal delayed by two frame periods;
a fourth delaying section configured to delay an output of the third subtracting section by one frame period; and a second temporal filter configured to compare the magnitude of the color motion component of an output of the fourth delaying section between adjacent frames and outputs the output of the fourth delaying section containing the larger color motion component as the third frame correlation signal.

11. The three-dimensional Y/C separating circuit according to claim 2, wherein, based on the switch controlling signal, the first delaying section produces the delayed composite video signal by delaying the composite video signal by two frame periods when the composite video signal input is a signal according to the first system and produces the delayed composite video signal by delaying one frame period when the composite video signal input is a signal according to the second system.

12. The three-dimensional Y/C separating circuit according to claim 2, wherein the signal according to the first system is a composite video signal according to the PAL system.

13. The three-dimensional Y/C separating circuit according to claim 2, wherein the signal according to the second system is a composite video signal according to the NTSC system.

* * * * *